May 9, 1933.  F. J. LYDEN  1,908,522
ELECTRIC MOTOR
Filed Jan. 27, 1932   2 Sheets-Sheet 2

Inventor
Frank J. Lyden
By
Arthur R. Woofork, Attorney

Patented May 9, 1933

1,908,522

UNITED STATES PATENT OFFICE

FRANK JOSEPH LYDEN, OF TORONTO, ONTARIO, CANADA

ELECTRIC MOTOR

Application filed January 27, 1932. Serial No. 589,108.

This invention relates to electric motors of the induction type, and is particularly directed to single-phase electric motors.

In single-phase induction motors of the split-phase type difficulty has been experienced due to the fact that an ordinary single-phase induction motor as generally constructed has a low starting torque which is usually produced by some special means. Single-phase motors have been made in which a condenser is associated with one of two windings on the motor, but it has been found that with the motors as heretofore constructed that if the condenser were large enough to give an adequate starting torque, it would be too large when the motor was running under normal load.

In order to overcome the defect noted immediately above various means have been provided for operating switches, either manually or automatically, to vary the connections to the motor after it has once started. These devices involve mechanically an element of uncertainty in the operation of the motor, and electrically a speed-torque characteristic which is unstable at the operating speed of the switch.

This invention is designed to overcome the defects noted above, and objects of this invention are to provide a novel form of induction motor in which no switching mechanism whatsoever is employed, but in which an automatic altering of the electrical conditions of two windings in the motor is secured without any switching mechanism whatsoever, but through means inherent in the construction itself, so that a single-phase motor is provided which has the desirable characteristics, but which involves no auxiliary switching mechanism whatsoever.

Further objects are to provide a single-phase motor by using a standard two-phase motor, having the same number of turns and wire size in each phase, although it is not necessary, in connection with the equipment necessary to assure the desired operating condition.

Further objects of this invention are to provide a single-phase motor, which has similar characteristics as a two-phase or a polyphase motor in regard to speed torque characteristic, efficiency, and power factor, and to provide a single-phase motor having a stable speed torque characteristic throughout the range and a starting torque, which can be increased by using a high resistance or a high reactance motor.

Further objects are to provide a single-phase motor which for a certain rating can be built in the same frame size as a polyphase motor, while motors as heretofore constructed have a polyphase to single-phase output ratio of 1 to ⅔.

Further objects are to provide a single-phase motor which has a high efficiency, high power factor and an almost true rotating field in smaller frame sizes than heretofore possible.

Further objects are to provide a single-phase motor, which may be cheaply constructed due to the reduction in frame size and the absence of auxiliary starting apparatus.

Further objects are to provide a single-phase motor, which is fool proof in its operation and which does not require any auxiliary starting apparatus.

Embodiments of the invention are shown in the accompanying drawings, in which.

Figure 1:
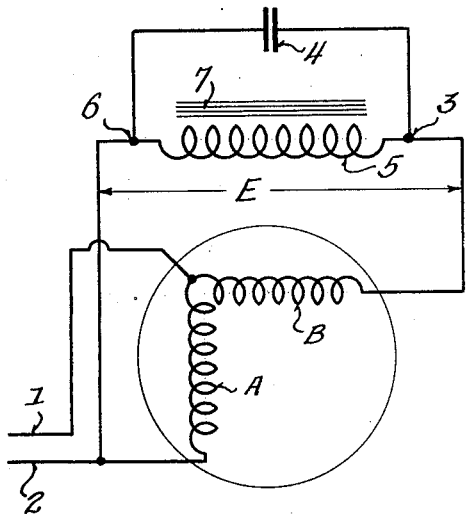
Figure 1 is a schematic view of one form of the invention.
Figure 3:
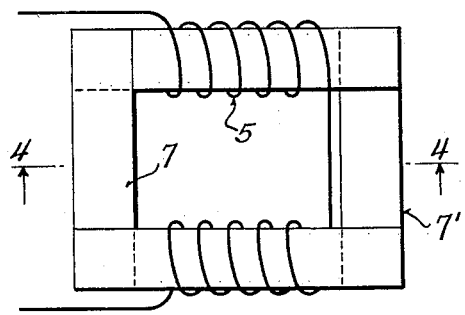
Figure 3 is a view of the transformer or choke employed in one of the circuits.
Figure 2:
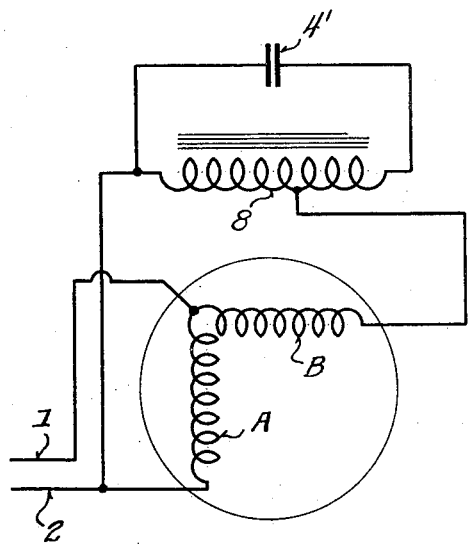
Figure 2 is a similar view showing a different form of the invention.

The new single-phase condenser motor has a main winding A, see Figures 1 and 2, and an auxiliary winding B, which is displaced by 90 electrical degrees from winding A. The motor may have more turns in winding B than in winding A, it may have the same number of turns in both phases, or less turns in phase B than in phase A. The winding A is directly connected to the supply leads 1 and 2. The winding B is directly connected to one of the leads, for example the supply lead 1, and at the other end of the winding B it is connected to a common point 3 leading to a condenser 4 and a transformer or choke coil 5. The other ends of the choke coil or transformer and condenser 4 are connected to a common point 6 and from thence to the supply lead 2. The core of the choke or transformer is indicated by the reference character 7 in Figure 1.

However, it is not necessary to directly connect the free end of the winding B to the condenser. Instead, an autotransformer effect may be secured by providing a transformer 8 which is connected at an intermediate point to the free end of the winding B, the terminals of the transformer 8 being connected to the condenser 4'. The other connections are as previously described in connection with Figure 1.

Figure 4:
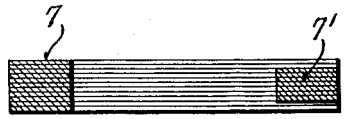
Figure 4 is a sectional view on the line 4—4 of Figure 3.
Figure 6:
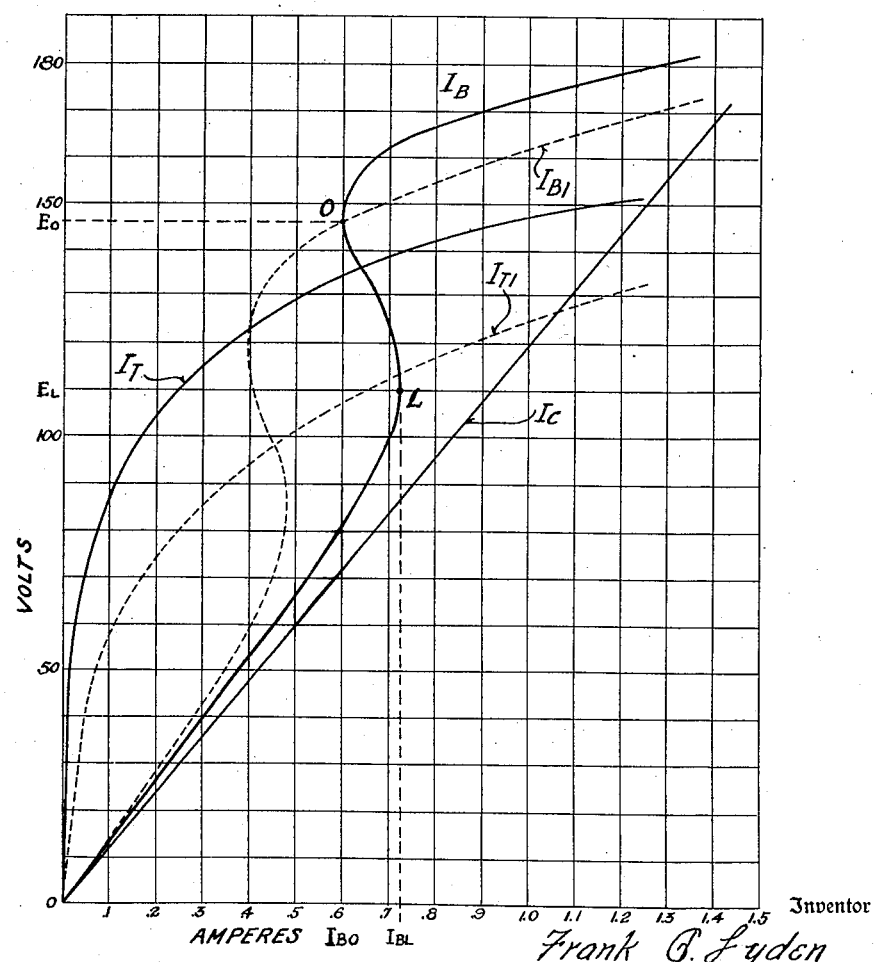
Figure 6 is a view showing a series of curves indicating the relation between current and voltage taken by a condenser and a parallel connected transformer. It shows that within a certain range an increase in voltage follows a decrease in current.

In order to appreciate the operating characteristics of this motor, it is necessary to state at this point that a transformer and a condenser connected in parallel such as used in connection with this motor show, with a voltage E impressed across this circuit, a rather peculiar current characteristic, as shown in Figure 6. The curves in Figure 6 are actual test data. Two sets of curves are shown. The full line curves were taken with a transformer having a uniform core cross section 7, see Figure 4, in all four legs, and the dotted line curves were taken with the same transformer, when the cross section of one leg was reduced (7' in Figure 4). The condenser capacity was not changed during the two tests taken.

$I_B$ = total current taken by circuit with transformer cross section 7.
$I_T$ = current taken by transformer with transformer cross section 7.
$I_C$ = current taken by condenser with transformer cross section 7.
$I_{B1}$ = total current taken by circuit with transformer cross section 7'.
$I_{T1}$ = current taken by transformer with transformer cross section 7'.
$I_C$ = current taken by condenser with transformer cross section 7'.
E = voltage impressed across this circuit.

Starting with a low voltage E impressed across this circuit and gradually increasing it, one finds that the current $I_B$ or $I_{B1}$ increases with increasing voltage at first until the transformer is near saturation (knee in the saturation curves $I_T$ or $I_{T1}$). From here on an increase in voltage will result a decrease in current $I_B$ or $I_{B1}$ until at a still higher voltage E the current again increases. This dip in the volt-ampere curve is very important, can always be demonstrated, can be shifted for instance, by reducing the core cross section of the transformer (see $I_{B1}$ in Figure 6), thus working a change in the saturation curve from $I_T$ to $I_{T1}$, or it can be increased or decreased by changing the condenser capacity.

This circuit can be so designed with a proper saturation curve of a suitable transformer (probably with high leakage and small airgap, or by any other suitable method) and with the correct condenser capacity, that any desired leading current $I_{BL}$ may be obtained at the voltage $E_L$ and that any leading current $I_{B0}$, which value is smaller than $I_{BL}$, may be obtained at the voltage $E_0$, which value is higher than $E_L$ (see Figure 6).

If a standard or previously known connection is employed on a condenser motor, a relatively large condenser must be provided which would be so large that if it produces high starting torque, would be too large for the apparatus to efficiently operate at full load, and with the standard or previously known connection and construction, it is necessary to reduce the condenser capacity by disconnecting part of the condensers, or, which is equivalent, reduce the voltage across the condensers.

To approach ideal conditions the condenser capacity should be decreased gradually from zero speed to no load speed to assure a current in the auxiliary or B-phase of the same value as the current in the main phase but displaced by 90°.

The voltage across the condenser on a single-phase condenser motor with condensers permanently connected across both phases, is low at starting and increases with the motor speed, reaching its highest value with the motor running synchronous speed, due to the field set up in the auxiliary or B-phase by the revolving field. As the capacitive current in a condenser is proportional to the voltage, the current in the auxiliary or B-phase will be low at starting, resulting in low torque, and the current at no load very high, whereas the ideal condition should be just the contrary.

This ideal condition can very nearly be obtained with this new condenser motor, employing no switch whatsoever, but secure the decreasing leading current in the auxiliary or B-phase with an increasing voltage, that is, with increasing speed from standstill to no load, by means of the above described transformer condenser circuit and designing said circuit so that it operates around point L with the motor locked and around point O with the motor running idle.

Figure 5:
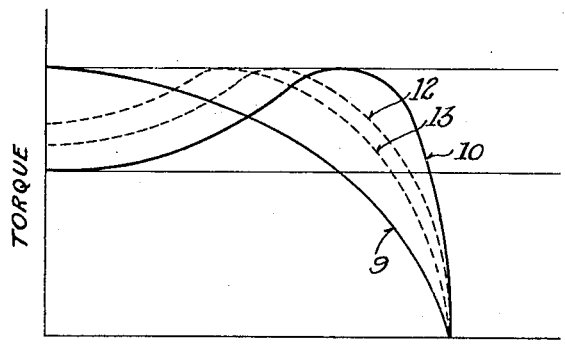
Figure 5 is a view showing speed torque characteristics of the high torque condenser motor as heretofore constructed and of the new condenser motor.

It is therefore apparent that the starting torque and the maximum torque can be brought up by proper design of the apparatus to almost the same value as on a two-phase motor and the speed torque characteristic may be changed to suit the particular requirements by using high resistance or high reactance rotors, just as it is done on ordinary polyphase motors. Figure 5 shows speed torque characteristics of a new condenser motor with various rotor resistances. The full line curve 9 indicates the relation between torque and speed for a motor which has a high resistance rotor. The curve 10 shows the relation between torque and speed for a motor which has a low resistance rotor. The dotted line curves 11 and 12 show the curves for motors having characteristics in between the extremes previously described. High reactance rotor can be shown in a similar manner.

In an actual device constructed in accordance with this invention a standard two-phase motor had been used rated ¼ H. P. with a high resistance rotor. This motor tested as a two-phase motor delivered its maximum torque at starting being 3.15 times full load torque.

Using this motor in the described manner as a new single-phase condenser motor with properly designed transformer and condenser it also delivered its maximum torque at starting being 2.25 times full load torque. Some of its test data are:

| | Amperes |
|---|---|
| Locked current in phase B | 2.1 |
| Locked current in phase A | 2.8 |
| Locked line current | 3.8 |
| Full load current in phase B | .9 |
| Full load current in phase A | 1.2 |
| Full load line current | 1.68 |

When this very same motor was connected as a standard single-phase low torque condenser motor with fixed condensers connected in the usual manner, the maximum torque obtainable was, of course, very low.

The ¼ H. P. rating for this frame size in polyphase cannot ordinarily be kept in single phase and for the proper commercial rating of ⅙ H. P. for this motor in single phase. The motor showed a maximum torque of 1.45 times full load torque and a starting torque of 0.55 times full load torque. Despite the high resistance rotor, the starting torque was much lower than the maximum torque. The current decreasing effect in the B-phase with increasing speed cannot be obtained with the ordinary condenser motor. Some of its test data are:

| | Amperes |
|---|---|
| Locked current in phase B | .36 |
| Locked line current | 2.55 |
| Full load current in phase B at ⅙ H. P. | 0.43 |
| Full load line current at ⅙ H. P. | 1.15 |

This invention therefore produces an extreme advantage in the proper design and proportioning of the motor so that its external characteristics may be adjusted to suit any particular standard or unusual condition which it is desired to meet. The principle outlined in this invention gives more flexibility to the design of the motor, but primarily secures a single-phase induction motor which has a high starting torque, which has a high efficiency and power factor, and further, in which no auxiliary switching means or altering of the circuits from starting to full load running conditions is required.

It is to be understood that the expression "transformer" and the expression "choke" are used in an interchangeable sense, and therefore such expressions are to be interpreted in this manner wherever they appear in the appended claims.

Although this invention has been described in considerable detail, it is to be understood that such description is intended as illustrative rather than limiting, as the invention may be variously embodied and is to be interpreted as claimed.

I claim:

1. An induction motor having a pair of electrically spaced windings, a pair of leads connected to the terminals of one of said windings, a unit consisting of an inductance and a condenser connected in effective parallel to said inductance, said unit being connected to said leads in series with the other of said windings, said last mentioned winding having a greater number of turns than said first mentioned winding, said inductance being magnetically saturated during starting of said motor.

2. An induction motor having a pair of electrically spaced windings, a pair of leads connected to the terminals of one of said windings, an inductance, a condenser directly connected to the terminals of said inductance, said inductance and said condenser being connected directly in series with the other of said windings across said leads, said inductance including an iron core magnetically saturated during starting.

3. An induction motor having a pair of electrically spaced windings, a pair of leads connected to the terminals of one of said windings, an inductance, a condenser directly connected to the terminals of said inductance, said inductance and said condenser being connected directly in series with the other of said windings across said leads, said inductance including an iron core magnetically saturated during starting, said last mentioned winding having a larger number of turns than said first mentioned winding.

In testimony whereof, the signature of the inventor is affixed hereto.

FRANK JOSEPH LYDEN.